March 4, 1941. J. H. BALLARD 2,233,723
OIL CONTROL PISTON RING
Filed Oct. 30, 1939
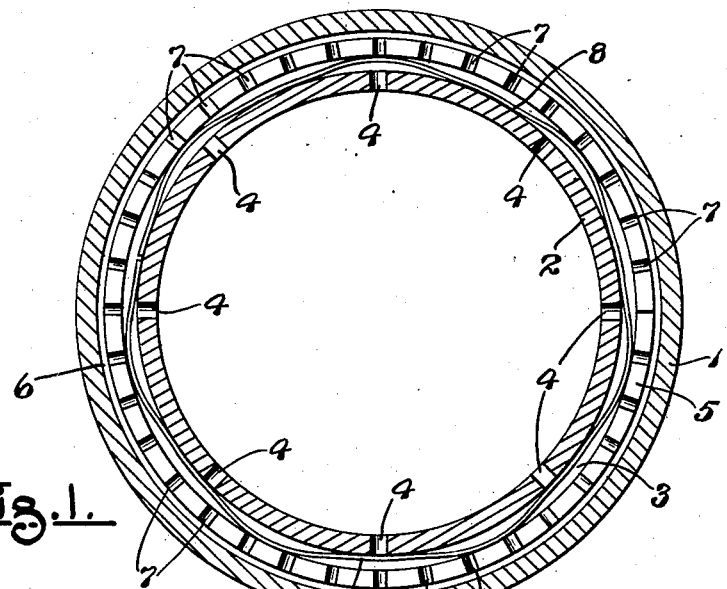
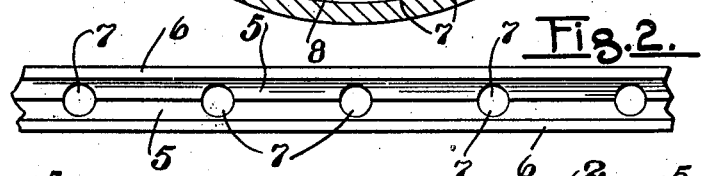
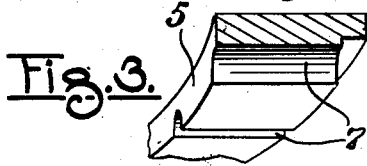
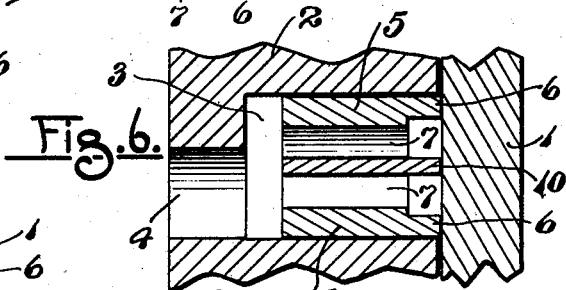
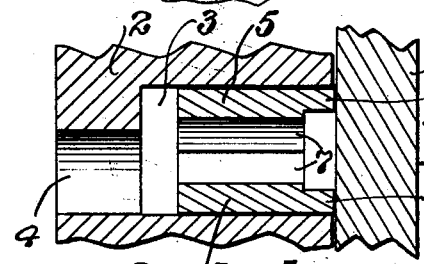
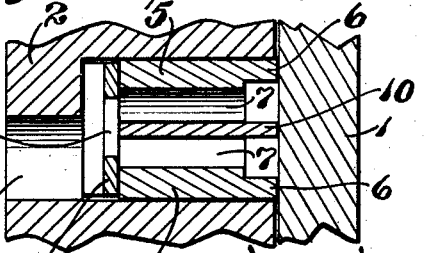
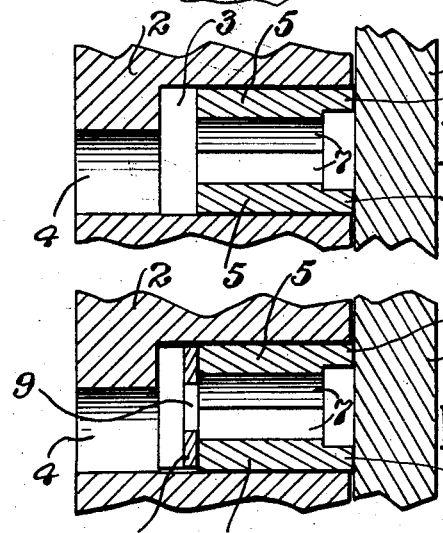
Inventor
John H. Ballard
By Lusnance and
Van Antwerp
Attorneys Patented Mar. 4, 1941

2,233,723

UNITED STATES PATENT OFFICE 2,233,723

OIL CONTROL PISTON RING

John H. Ballard, Muskegon, Mich., assignor to Sealed Power Corporation, Muskegon, Mich., a corporation of Michigan Application October 30, 1939, Serial No. 301,938

2 Claims. (Cl. 309—45)

This invention relates to piston rings of the kind used in internal combustion engines. When the cylinder and the piston are new, the consumption of lubricating oil, with regular piston rings which have been perfected for such purpose, is low, and there is no need for any special type or character of piston ring beyond the usual and general set of piston rings which are used. A set of piston rings for a piston ordinarily comprehends plain rings, rectangular in cross-section, in the upper grooves of a piston and a so-called oil ring or oil draining ring in the lowermost groove of the piston ring. Such oil ring is vented to permit passage of oil therethrough to the bottom of the piston ring groove, and passages lead from the bottom of the groove to the interior of the piston.

After an engine has run a considerable length of time, varying with different models of engines, it has been found that the piston rings are called upon to perform very drastic oil control due to the worn condition of the cylinder walls. This condition can be remedied by reconditioning the cylinders and using over-sized pistons and rings, that is, remachining or reboring the cylinders, which however, is an expensive proceeding. Various types of piston rings to replace those used initially have been produced to serve the purpose desired. But such replacement of piston rings and particularly the oil control or oil draining rings used require the manufacture and maintenance in stock of oil rings for the many different types and characters of pistons and many different dimensions of piston ring grooves which are commercially used.

The present invention is directed to a novel character of oil ring which when initially installed in a new engine may consist of two cast iron ring members only, each of identical construction and one placed over the other, the two ring members being reversed in position and when thus placed together forming a piston ring with oil passing openings or vents therethrough, properly filling the groove of the piston in which it is installed. When the engine has been in service for a considerable length of time and the cylinder walls have become worn somewhat and the outer bearing edges of the piston rings themselves likewise worn so that a higher consumption of oil takes place, this defect may be cured by merely removing the two ring members and placing within the piston ring groove a so-called expander which has openings therethrough for oil passage and which is a length of thin flat spring material of proper shape lying between the bottom of the piston ring groove and the inner curved sides of the ring members. The expander forces the rings outwardly and causes them to bear at their outer bearing surfaces with greater pressure against the walls of the cylinder. A third condition of the engine after it has operated even longer and when it again begins to consume more oil than desired, is to remove the two-part oil ring and the expander from the groove in which installed and substitute therefor two other ring members of slightly less width in the same position with respect to each other, placing between them a thin steel ring member which, like the cast iron piston ring members themselves, is parted at one side and has a tendency to spring open at the parting so that when it is closed by compression and with the ring members between which it is located placed within a ring groove, it together with the cast iron ring members tend to spring outwardly so as to bear at its outer curved edge against the cylinder wall between the two cast iron ring members. And a final form of the ring, particularly when the cylinder wall has become very badly worn, is to use the two cast iron ring members with the thin steel ring member between them and place back of all three the expander. The expander will bear against the inner curved edges of the upper and lower ring members, but will not bear against the thin steel ring member since it has sufficient tension in itself for high unit pressure against the cylinder wall.

With the invention which I have made, it is readily possible to manufacture and have in stock cast iron ring members and intermediate steel members, and the stock which is required to be maintained be greatly reduced. For example, one ring groove used is one-eighth of an inch in width and another is five-thirty-seconds of an inch in width. For those pistons which have the wider groove, five-thirty-seconds of an inch, the two cast iron ring members which were installed therein initially may be removed and two of the ring members which would be used initially in grooves one-eighth of an inch in width used with a steel ring member one-thirty-second of an inch in thickness between them. This same method followed in larger engines wherein the pistons are larger and the grooves are wider may be followed and a manufacturer of piston rings have stock held on hand to supply orders as they are received, but a proper survey of the different widths of ring grooves and the different diameters of pistons, may reduce his stock on hand to a minimum and yet permit supplying all calls for replacement rings received.

The invention which I have made is therefore of a very useful character and is directed to the attainment of the beneficial results recited. It may be understood from the following description, taken in connection with the accompanying drawing, in which:

Fig. 1 is a horizontal section through a cylinder with a piston therein, a groove of the piston being equipped with the piston ring of my invention.

Fig. 2 is a fragmentary edge view of a two-part ring made in accordance with my invention.

Fig. 3 is a fragmentary perspective and section of one of the cast iron ring members, and Figs. 4, 5, 6 and 7 are fragmentary enlarged vertical sections of assembled piston, piston ring and cylinder, said sections being transversely through the piston rings, showing the several steps of installation of the piston ring of my invention.

Like reference characters refer to like parts in the different figures of the drawing.

The cylinder 1 within which a piston 2 is mounted for reciprocation, may be of any conventional type and the piston ring groove 3 in which the oil draining ring of my invention is to be installed, has a plurality of passages 4 leading from the bottom thereof to the interior of the piston in accordance with well-known practice.

With my invention a piston ring is made of two parts 5, each of which at its outer periphery is cut inwardly therearound to leave a projecting lip 6. The thicker portions of the ring inside of said rib 6 are provided with a plurality of radial passages 7 which in practice are produced by placing one of the ring members over the other and drilling holes radially therethrough between the projecting annular ribs 6 so that in each of the ring members a passage semi-circular in cross section is made as indicated at 7. When the two ring members are placed together, as shown in Figs. 2, 4 and 5, the semi-circular passages 7 may lie one directly over the other, as in Fig. 2. However, this is not in any way essential to the invention as the ring members may be so located that the passages instead of consisting of two semi-circular passages located together, may consist of the semi-circular passages in the two ring members in a staggered relation to each other.

The ring members 5 of cast iron are parted at one side in the usual way, and the partings normally spring open when the rings are free of pressure at their outer peripheral surfaces, but when installed within an engine cylinder the partings are substantially closed, and the ring members, because of their compression, have a normal tendency to press outwardly and thus bear at the peripheral edges of the ribs 6 against the walls of the cylinder, as in Fig. 4. Between the ribs 6 there is thus provided a continuous annular groove from which the oil carrying vent passages 7 may conduct oil to the bottom of the piston ring groove and therefrom it will flow inwardly through the passages 4 to the interior of the piston and back to the engine crank case.

In Fig. 5 the same two cast iron piston ring members 5 are located in the same manner in the piston but have associated therewith a spring expander 8 with oil passing openings 9 therethrough. A spring expander used with a piston ring in itself is old and well-known. By locating it between the bottom of the piston ring groove and the inner curved sides of the ring parts 5, said ring parts 5 in addition to their normal tendency to press outwardly, are pressed against by the spring expander and the bearing of the ribs 6 against the cylinder wall is increased.

In Fig. 6 between the two ring members a thin flat ring member 10 of steel is placed as shown, thereby dividing the annular groove between the ribs 6 into two annular grooves, one above and the other below the projecting portion of the steel member 10. The steel member is also parted at one side and has a tendency to open at said parting when free, and thus when compressed it will tend to open at the parting and will bear at its outer peripheral edge against the cylinder walls.

In Fig. 7 the same assemblage of the cast iron member 5 and the steel member 10 is used but back of such ring members within the ring groove the expander 8 is installed. The expander bears only against the members 6 and not against the member 10 because of its own tension being sufficient to bear against the cylinder wall.

The construction described is a very desirable construction in piston rings. It will be noted that in the manufacture of this ring only three parts will be necessary to complete the line for an automotive engine; a steel ring member and two thicknesss of cast iron members. Also as previously stated, those of the cast iron members 5 of a certain diameter can be used together to make a one-eighth of an inch wide divided cast iron ring, and the same two cast iron members separated by the steel member becomes a five-thirty-second inch ring in thickness capable of use where more drastic oil control is required. Furthermore, two of the ring members of proper thickness can make a five-thirty-second inch wide ring to be used in a ring groove five-thirty-seconds of an inch wide and the same two cast iron ring members with a steel ring member between them become the equipment to be used in a groove three-sixteenths of an inch wide for more drastic oil control in a piston which has a three-sixteenth inch wide piston ring groove. Other examples might be recited until the widest of ring grooves was reached.

The invention is defined in the appended claims and is to be considered comprehensive of all forms of structure coming within their scope.

I claim:

1. A piston ring comprising two ring members of cast metal of identical form located one over the other and reversely positioned with respect to each other, each of said ring members being parted at one side and including a body of rectangular cross section and a continuous annular rib extending therefrom outwardly at the upper portion of the upper ring member and at the lower portion of the lower ring member, thus providing a continuous annular groove around the two parts of the ring between said ribs, the adjacent contacting portions of said two ring members having a plurality of spaced radial grooves therein extending upwardly into the body of the upper ring member and downwardly into the body of the lower ring member, a third member of thin flat steel parted at one side, located between the two ring members, dividing the groove into upper and lower grooves, said radial grooves providing passages leading from said upper and lower grooves through the ring members above and below the steel member, all of said ring members normally springing open at their partings when free of peripheral pressure and being contracted and the partings closed when located within an engine cylinder, the radial depth of the steel ring member being the same and not exceeding the combined depth of the body and rib of a cast ring member, and a spring expander member adapted to be located within and against the inner curved edges of all of said ring members, said expander being of a generally circular form but adapted to be compressed between the ring members and the bottom of a piston ring groove and having a plurality of spaced openings therein around the length thereof communicating with the passages both above and below said steel member.

2. A piston ring comprising, two cast ring members of identical form, one located over the other and in an inverted position with respect thereto, each of said ring members comprising a body rectangular in cross section and having a continuous annular rib extending from the body at a flat side thereof, said ribs when the two ring members are located as stated being spaced from each other thereby providing a continuous annular groove around the assembled ring, the abutting portions of the two ring members having spaced apart radial passages therethrough, which passages in each ring member are open at the side thereof which contacts with the like side of the adjacent ring member, and a third ring member of thin flat steel inserted between said first ring members and having a radial depth equal to the combined depth of the body of a first mentioned ring member and the rib thereof, whereby the outer edge portion of said steel member extends across and divides the annular groove between said ribs into two grooves, from which passages lead through the assembled ring above and below the steel member.

J. H. BALLARD.